United States Patent [19]
Groblebe

[11] 4,010,962
[45] Mar. 8, 1977

[54] BOAT LOADING STRUCTURE

[76] Inventor: John T. Groblebe, 467 W. 8th St., Perris, Calif. 92370

[22] Filed: May 22, 1975

[21] Appl. No.: 579,841

[52] U.S. Cl. .............................. 280/414 R; 214/84
[51] Int. Cl.² ........................................ B60P 3/10
[58] Field of Search ................... 280/414 R; 214/84

[56] References Cited
UNITED STATES PATENTS

| 3,021,969 | 2/1962 | Peake et al. | 214/84 |
| 3,064,617 | 11/1962 | Meagher | 280/414 R |
| 3,447,815 | 6/1969 | West | 280/414 R |
| 3,603,465 | 9/1971 | King | 280/414 R |
| 3,873,130 | 3/1975 | Whitley | 280/414 R |

FOREIGN PATENTS OR APPLICATIONS

| 1,593,508 | 6/1970 | France | 280/414 R |

Primary Examiner—Joseph F. Peters
Assistant Examiner—John A. Pekar
Attorney, Agent, or Firm—Harvey S. Hertz

[57] ABSTRACT

A boat loading structure includes a trailer having a pair of longitudinally extending side rails. A plurality of pairs of bar assemblies are mounted on the side rails, each bar assembly of each pair being mounted on respective side rails. The pairs of bar assemblies are mounted in a plane perpendicular to the longitudinally extending side rails. Each of the bar assemblies includes a base secured to one of the side rails. A vertical rod extends upwardly from the base. A spring interconnects the base and the vertical rod. A roller member is rotatably mounted on the other end of the vertical rod.

4 Claims, 3 Drawing Figures

U.S. Patent  Mar. 8, 1977  4,010,962
FIG.1.
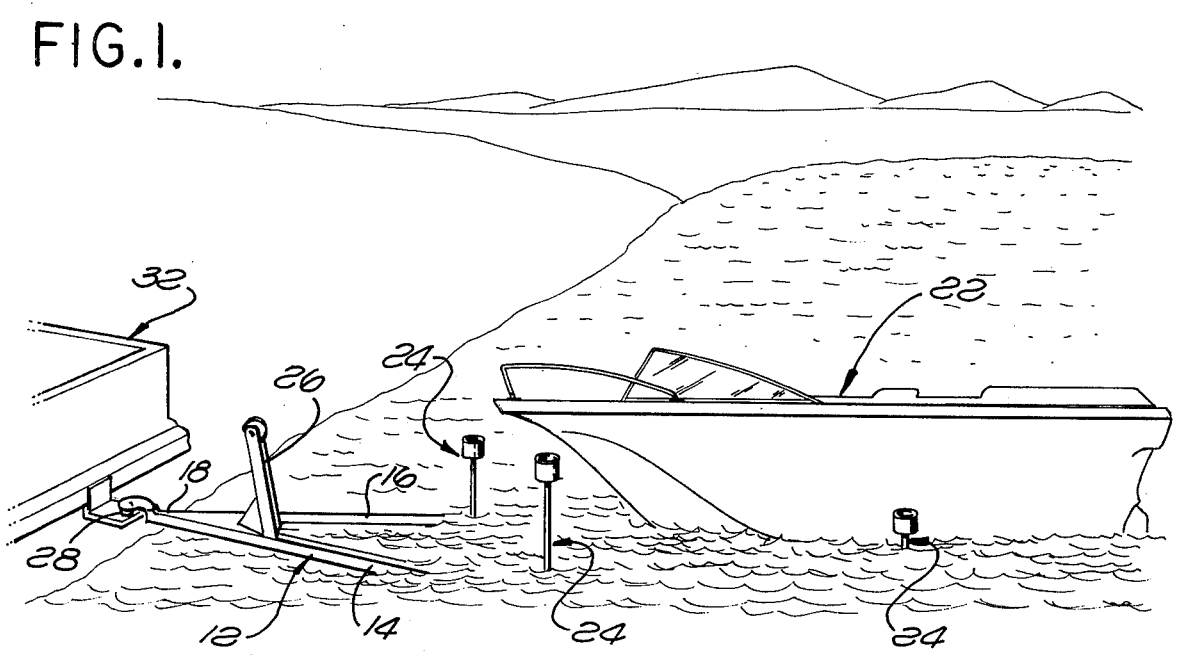
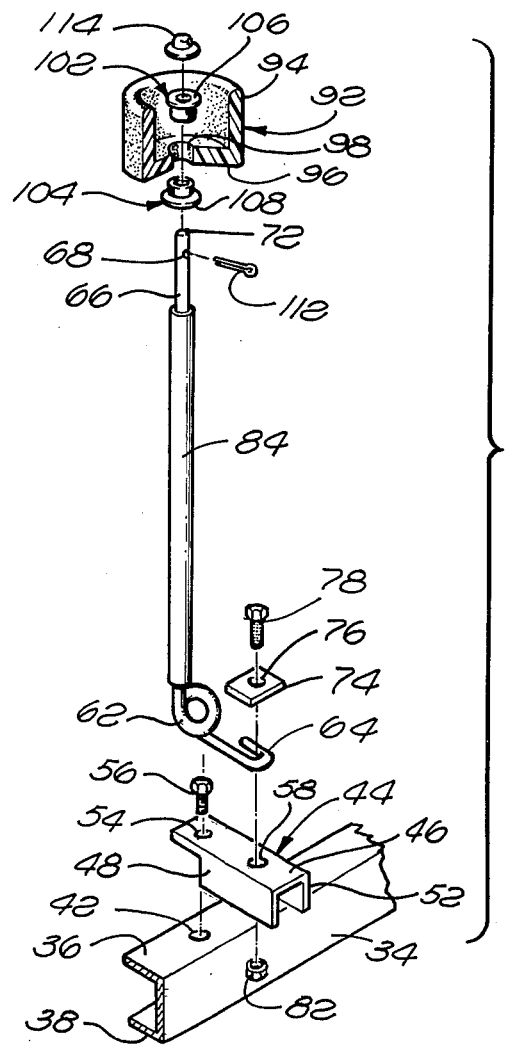
FIG.2.
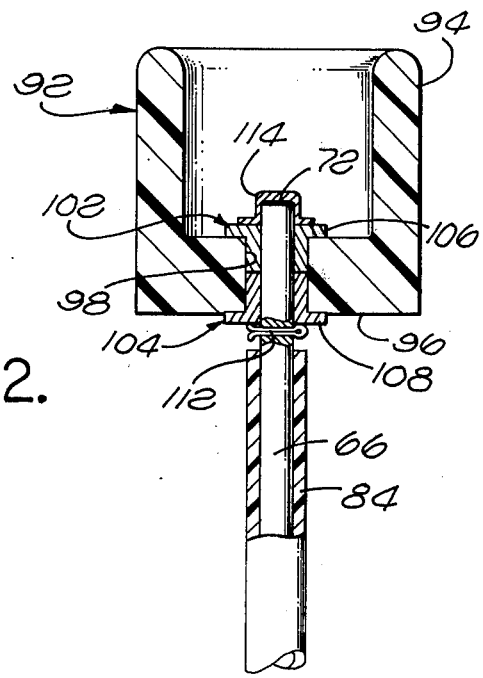
FIG.3.

BOAT LOADING STRUCTURE

BACKGROUND OF THE INVENTION

1. Field of the Invention

The field of art to which the invention pertains includes the field of boat loading structures, particularly with respect to a structure for facilitating loading and unloading of a boat from a trailer.

2. Description of the Prior Art

Conventional boat loading structures which are mounted on a boat trailer, are normally positioned so that the structure supports the hull of the boat. Typically, such structures are integrally formed or connected to the trailer. Normally such devices are submerged when the trailer is positioned in the water during the loading and unloading of the boat. While vertically extending indicator guides can be mounted on the trailer, these guides normally are utilized merely for an indication of the position of the trailer so that the boat can be correctly positioned on the trailer and perform no other useful function.

Known prior art includes U.S. Pat. Nos. 3,064,617; 3,756,439; 3,822,899; and 2,984,498.

The present invention enables a boat to be centered evenly on the trailer during loading by providing a force against the sides of the boat. The boat motor can be run at a slow speed and the boat can be correctly positioned on the trailer without the use of a winch. The invention is also used to hold the boat steady in the water, preventing rocking and rolling thereof, and the resultant damage to the boat from rubbing of the boat against the trailer. During launching of the boat, the boat is propelled off the trailer when the mechanism securing the boat to the trailer is released.

SUMMARY OF THE INVENTION

A boat loading structure includes a trailer having a pair of longitudinally extending side rails. A plurality of pairs of bar assemblies are mounted on the side rails, each bar assembly of each pair being mounted on respective side rails. The pairs of bar assemblies are mounted in a plane perpendicular to the longitudinally extending side rails. Each of the bar assemblies includes a base secured to one of the side rails. A vertical rod extends upwardly from the base. A spring interconnects the base and the vertical rod. A roller member is rotatably mounted on the other end of the vertical rod.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a perspective view of the boat loading structure illustrating the technique of loading and unloading the boat;

FIG. 2 is an exploded view, partly in section, of the bar assembly used in the present invention; and FIG. 3 is a partial sectional view of a portion of the bar assembly of FIG. 2.

DESCRIPTION OF THE PREFERRED EMBODIMENTS

Referring now to the drawings, there is shown in FIG. 1 a boat loading structure constructed in accordance with principles of the invention. The boat loading structure is formed of a boat trailer 12 having a pair of longitudinally extending side rails 14 and 16 which are joined together at a tow connection end 18.

The trailer 12 is utilized to load and unload a boat 22 in the water and includes a plurality of bar assemblies 24 extending vertically from the side rails 14 and 16. Normally the bar assemblies 24 are mounted in pairs, with one of the pairs being secured to each of the side rails 14 and 16, respectively, in planes perpendicular to the longitudinally extending side rails. As is conventional, winch 26 is positioned at the tow connection end of the trailer. The tow connection end 18 may further contain a tow ball 28 or similar device for enabling the trailer to be connected to a vehicle 32 used to tow the trailer 12.

Referring now to FIG. 2 the bar assembly is illustrated in greater detail in an exploded configuration. The bar assembly is mounted on one of the side rails 14. The side rail 14 is of generally U-shaped configuration and is formed of a side wall 34 which is used to interconnect an upper wall 36 to a lower wall 38. The opening in the side rail 14 faces the opposed opening in the side rail 16. A circular opening 42 in the side rail top wall 36 is used in combination with an adaptor bracket 44 to secure the bar assembly to the side rail 14.

The adaptor bracket 44 is of generally U-shaped configuration and comprises a top wall 46 and a pair of side walls 48 and 52. The side walls 48 and 52 are cut away at one end, enabling the cut away ends of the side wall to be positioned adjacent the outer surface of the side rail side wall 34. The adaptor bracket top wall 46 contains a first opening 54 which is aligned with the opening 42 in the side rail. A bolt 56 passes through the openings 42 and 54 enabling the adaptor bracket 44 to be secured to the side rail by means of a nut (not shown) which is fastened to the bolt 56. The adaptor bracket top wall 46 further contains a second opening 58.

The bar assembly 24 further comprises a coiled spring 62 looped in a plane perpendicular to the axis of the longitudinally extending side rails 14 and 15 when mounted in the bracket 44. One end of the coiled spring 62 is integrally formed with one end of a U-shaped base 64. The base 64 is positioned on the adaptor bracket top wall 46 in a plane parallel thereto. The other end of the coiled spring 62 is integrally formed with a vertically extending rod 66. An opening 68 is formed in the vertically extending rod in a plane perpendicular to the axis of the vertically extending rod 66 directly below the top end 72 of the rod 66.

A clamp 74 is formed of a rectangular plate having a central opening 76 therethrough, with the opening 76 being aligned with the second opening 58 formed in the adaptor bracket top wall 46. The clamp 74 is positioned over the U-shaped base 64 and a bolt 78 passes through the clamp opening 76, the arms of the U-shaped base 64 and the adaptor bracket second opening 58. The bolt 78 is fastened to the adaptor bracket 44 by means of a nut 82, thus securing the U-shaped base 64 between clamps 74 and the adaptor bracket 44. A slidably movable vinyl tube 84 surrounds the vertically extending rod 66 and is used to protect the surface of the boat 22 from being damaged by the rod 66. Normally the rod 66, the coiled spring 62 and the base 64, which are integrally formed, are made of steel or other spring metal.

A soft rubber roller 92 is mounted on the top of the vertically extending rod 66. The roller 92 is of generally cup-shaped configuration and is formed of a cylindrical side wall 94 and a bottom wall 96. A central opening 98 is formed in the roller bottom wall 96.

A first T-bearing 102 and a second T-bearing 104 are fitted in the opening 98 of the cup-shaped member 92. The T-bearings 102 and 104 each have a central opening through which the top end 72 of the vertically extending rod 66 is inserted. The T-bearings are mounted on opposed configuration as illustrated in FIGS. 2 and 3, with the first T-bearing flange 106 abutting the top surface of the roller bottom wall 96 and the second T-bearing flange 108 abutting the bottom surface of the bottom wall 96. When in the assembled position, shown in FIG. 3, the opposed adjacent ends of the T-bearings will be juxtaposed of each other. Typically, the bearings 102 and 104 are made of bronze impregnated with graphite which forms a permanent self-lubricating surface with the rod 66 and prevents rusting of the rod.

A cotter pin 112 is inserted into the opening 68 formed in the vertically extending rod 66 and prevents the roller 92 from moving downwardly on the vertically extending rod 66. Once assembled in this position, a lock cap 114 is snapped onto the rod top end 72.

During loading, the boat 22 is moved at a slow idle speed in forward gear onto the trailer. When correctly positioned between the rear pair of bar assemblies as shown in FIG. 1, the spring 62 of each of the bar assemblies will exert a pressure upon the boat and will center the boat evenly on the trailer. The U-shaped base 64 of the assembly enables the bar assembly to be adjusted so that the desired pressure is provided against the side surface of the boat. During adjustment, the bolt 78 is loosened enabling the U-shaped base 64 to be moved transversely with respect to the side rails 14 and 16. The outer surface of the rollers 92 and the vinyl tube 84 are coated with a bright red or orange paint which act as reflectors and provide a desired warning, both during the loading operation as well as when the boat is being towed on the highway.

During launching the boat, the boat is released from its secured position, and the movement of the boat off the trailer causes rotation of the rollers 92, which due to the pressure being maintained on the boat, forming a propelling force enabling rapid release of the boat from the trailer. In addition, the rollers 92 which are normally made of soft rubber also tend to hold the boat steady in the water preventing the rocking and rolling motion common to all boats. This support prevents damage to the boat by preventing rubbing of the boat against the trailer. Moreover, the steadiness of the boat provided by the bar assemblies enables easy loading and unloading of passengers and supplies from the boat.

I claim:
1. A boat loading structure comprising:
   a boat trailer including a pair of longitudinally extending side rails;
   at least one pair of bar assemblies, each of said bar assemblies of each pair being mounted on respective side rails, said pair being mounted in a plane generally perpendicular to said side rails;
   each of said bar assemblies comprising:
   a base secured to said side rails;
   a vertical rod extending upwardly from said rail;
   a spring interconnecting said base and one end of said vertically extending rod;
   a roller member rotatably mounted on the other end of said spring rod; and
   means for varying the spacing between the springs of each bar assembly pair for providing a continuous variable adjustment of the amount of pressure exerted by said roller members.
2. A boat loading structure in accordance with claim 1 wherein said roller members are cup-shaped and contain a self-lubricating bearing surface formed against the vertically extending rod.
3. A boat loading structure in accordance with claim 1 wherein a slidable protective sleeve surrounds said rod.
4. A boat loading structure comprising:
   a boat trailer including a pair of longitudinally extending side rails;
   at least one pair of bar assemblies, each of said bar assemblies of each pair being mounted on respective side rails, said pair being mounted in a plane generally perpendicular to said side rails;
   each of said bar assemblies comprising:
   a base secured to said side rails;
   a vertical rod extending upwardly from said rail;
   a spring defined by a coil looped in a plane perpendicular to the axis of said side rails interconnecting said base and one end of said vertically extending rod; and
   a roller member rotatably mounted on the other end of said spring rod.

* * * * *